United States Patent Office

3,433,826
Patented Mar. 18, 1969

3,433,826
ALKOXYPHENYL-N-METHYL CARBAMIC ACID ESTER
Rudolf Heiss, Cologne-Stammheim, Ernst Böcker, Leverkusen, and Wolfgang Behrenz, Cologne-Stammheim, Germany, assignors to Farbenfabriken Bayer Aktiengesellschaft, Leverkusen, Germany, a corporation of Germany
No Drawing. Filed June 17, 1965, Ser. No. 464,864
Claims priority, application Germany, July 4, 1964,
F 43,354
U.S. Cl. 260—479           1 Claim
Int. Cl. C07c 125/00

ABSTRACT OF THE DISCLOSURE 3-alkyl-4-alkoxyphenyl-N-methyl carbamates, and especially 3-isopropyl-4-methoxyphenyl-N-methyl carbamate, which possess insecticidal properties.

---

The present invention relates to particular alkoxyphenyl-N-methyl carbamic acid esters which have insecticidal properties, to their compositions, as well as to the production and use thereof.

It is already known that certain N-methyl carbamic acid esters can be used with good results for combating insects. Some of these carbamates have a very high insecticidal activity and have, in fact, already attained great practical importance. The most important and most effective N-methyl carbamic acid esters are believed to include, in particular, α-naphthyl-N-methyl carbamate, 2-propargyloxyphenyl-N-methyl carbamate, and 2-isopropoxyphenyl-N-methyl carbamate.

It is an object of the present invention to provide particular alkoxyphenyl-N-methyl carbamic acid esters having valuable properties.

It is another object of the present invention to provide alkoxyphenyl-N-methyl carbamic acid esters which posses strong insecticidal properties and which retain residual effectiveness even after long periods of time.

It is another object of the present invention to provide such carbamic acid esters of the foregoing type which are substituted with lower alkyl as well as lower alkoxy on the phenyl moiety and which thereby possess not only high insecticidal activity but also high degrees of stability coupled with high retention of effectiveness even after long periods of time, and especially even where utilized on alkaline substrates.

It is another object of the present invention to provide such carbamic acid ester which advantageously possess markedly low toxicity towards warm-blooded animals and markedly low phytotoxicity, whereby such compounds may be used for a wide variety of applications, such as in general hygiene techniques for ridding stables, homes, and storage rooms of pests, and especially insects, as well as in crop control techniques, especially in connection with ridding agricultural crops of pests such as insects and the like.

It is still another objects of the present invention to provide a process for the production of such alkoxyphenyl-N-methyl carbamic acid esters which is versatile and efficient and which leads to comparatively high yields.

It is still another object of the present invention to provide such a process utilizing alkyl- and alkoxy-substituted phenols and methyl isocyanate, optionally in the presence of an inert solvent, and optionally in the presence of a reaction accelerator, utilizing a temperature falling within a comparatively wide range, including temperatures below room temperature as well as those contemplating boiling temperatures of the ingredients being reacted.

It is still a further object of the present invention to provide a process of the foregoing type utilizing a starting phenol materials those including new phenols such as 4-alkoxy-3-alkylphenols obtained initially from corresponding 1-alkoxy-2-alkylbenzenes.

It is still another object of the present invention to provide compositions of carbamic acid esters of the foregoing type with a carrier vehicle in the form of a dispersible liquid carrier or a dispersible solid carrier, for use in applying the instant active compounds more effectively and more readily to any surface, substrate, and the like.

It is still another object of the present invention to provide such compositions with the instant carbamic acid ester being present in a pesticidally, especially insecticidally, effective amount.

It is still another object of the present invention to provide compositions containing such carbamic acid esters of the foregoing type in which the ester is present within a wide percentage range of the mixture, encompassing both commercial application purposes as well as field application purposes, especially those having a particular use.

It is a further object of the present invention to provide methods of using the instant carbamic acid esters in a new way.

It is still a further object of the present invention to provide methods of combating pests, and especially insects, by applying to such pests and their habitat a pesticidally effective amount of the carbamic acid ester of the foregoing type.

It is still a further object of the present invention to provide such a method of combating pests which contemplates applying to a substrate or surface upon which such pests may be located, a pesticidally effective amount of such instant carbamic acid ester.

It is still a further object of the present invention to provide for hygiene control and especially crop control with respect to pests, which contemplates applying to indoor surfaces as well as outdoor surfaces and soil and plant crops, pesticidally effective amounts of the instant carbamic acid esters either alone or in admixture with a carrier vehicle, such as a dispersible liquid carrier or a dispersible solid carrier.

It is still a further object of the present invention to provide methods of combating pests utilizing particularly potent carbamic acid esters of the foregoing type and which contemplate long duration effectiveness and concomitantly less often application of the active compound or composition, in consideration of the particularly potent, stable and long-lasting effectiveness of the specific carbamic acid esters coming within the purview of the present invention.

Other and further objects of the present invention will become apparent from a study of the within specification and accompanying examples.

It has been found in accordance with the present invention that the new alkoxyphenyl-N-methyl carbamic acid esters of the general formula

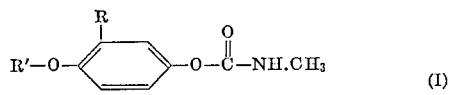

(I)

wherein R and R', which may be the same or different, represent lower alkyl radicals, preferably containing 1 to 4 carbon atoms, have strong insecticidal properties.

The particular alkoxyphenyl-N-methyl carbamic acid esters of general Formula I are obtained in accordance with the present invention, when a phenol of the general formula

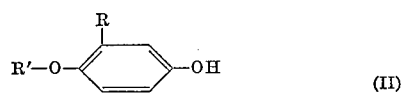

(II)

wherein R and R' have the same meanings as above, is reacted with methyl isocyanate.

It is most surprising that the particular alkoxyphenyl-N-methyl carbamic acid esters according to the present invention have a higher insecticidal activity than the previously known insecticidal carbamic acid esters. It is particularly surprising that the carbamic acid esters according to the present invention have such a high insecticidal activity as well as a high degree of stability and that, therefore, they retain their effectiveness over long periods of time, even on alkaline substrates, such as limed clay.

In accordance with the present invention, the phenols to be used as starting materials are clearly characterized by general Formula II above. In this formula, R and R' particularly include those alkyl radicals containing 1 to 4 carbon atoms, such as for example, methyl, ethyl, n-propyl, isopropyl, n-butyl, sec.-butyl and tert.-butyl radicals, whereby the final products will be the correspondingly substituted phenyl-N-methyl carbamic acid esters characterized by general Formula I above.

With respect to one particular embodiment of the present invention, the reaction contemplated by the instant method proceeds according to the following equation:

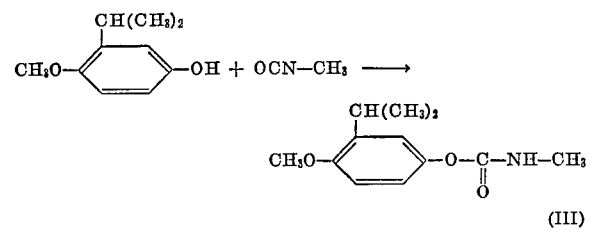

(III)

Suitably, the reaction in accordance with the present invention may be carried out in an inert solvent, diluent, or dispersing agent. If desired, the course of the reaction may be accelerated by adding small amounts of a strongly basic amine. However, the reaction may also be suitably carried out by reacting the components directly in the absence of any solvent, diluent or dispersing agent, and/or in the absence of any reaction accelerator.

As solvents or dispersing agents, there may be used in accordance with the present invention all inert organic solvents, preferably hydrocarbons, such as aliphatic hydrocarbons, especially paraffins, including petroleum fractions such as benzine fractions having a boiling point between about 30 and 160° C., especially $C_5$–$C_9$ aliphatic hydrocarbons, and the like; cycloaliphatic hydrocarbons, such as cycloalkyl, and especially cyclolower alkyl hydrocarbons, including cyclopentane, cyclohexane, and the like; aromatic hydrocarbons, and especially unsubstituted, as well as mono-, di-, and tri-lower alkyl-substituted, and nitro-substituted mononuclear aryl hydrocarbons having 6 ring carbon atoms, including benzene, toluene, xylene, mesitylene, nitrobenzene, and the like; halogenated aliphatic hydrocarbons, and especially chlorinated aliphatic hydrocarbons, including chlorinated lower alkyl and lower alkenyl hydrocarbons and especially di-, tri-, and tetrachloro-substituted lower alkyl and lower alkenyl hydrocarbons, such as methylene chloride, chloroform, carbon tetrachloride, trichloroethylene, tetrachloroethane, and the like; halogenated aromatic hydrocarbons, such as halogen substituted mononuclear aryl hydrocarbons having 6 ring carbon atoms, including mono-, di-, and tri-chlorobenzene, and the like; ethers, such as open chain and cyclic aliphatic ethers, and especially di-$C_1$–$C_6$ lower alkyl ethers, including dimethyl, diethyl, methylethyl, diisopropyl, diisobutyl ether, and the like, as well as cycloalkyl ethers, including dioxan, furan, tetrahydrofuran, and the like; and mixtures of such solvents.

With respect to the reaction accelerators which may be used, typical among these are tertiary amines, and especially tertiary alkyl amines, such as trimethylamine, triethylamine, diethylmonomethylamine, tripropylamine, dimethylcyclohexylamine, and the like, such tri-$C_1$–$C_6$ lower alkyl amines thus contemplating those alkylamines having various straight and branched chain substituents, including methyl, ethyl, n-propyl, isopropyl, n-butyl, isobutyl, sec.-butyl, tert.-butyl, the amyls, and the hexyls, as well as $C_5$–$C_6$ cyclolower alkyl substituted amines, including cyclopentyl, cyclohexyl, and the like, and corresponding mixed dialkyl-monocycloalkyl substituted and monoalkyl-dicycloalkyl substituted amines wherein the alkyl substituent or substituents and the cycloalkyl substituent or substituents contemplate the foregoing enumerated substituents; and mixtures of such amines.

The reaction temperatures contemplated in accordance with the present invention may be varied within a particularly wide range, and in general the reaction may be carried out at a temperature substantially between about 0 and 150° C.

Some of the phenols required as starting materials are also new compounds. These new phenols are obtained in a simple manner by known methods, for example, by reacting 1-alkoxy-2-alkylbenzenes with acetic anhydride under the conditions of a Friedel-Crafts reaction, i.e., in the presence of a catalyst, such as aluminum chloride or ferric chloride, and in the presence of an inert solvent, for example, carbon disulfide, at room temperature or at somewhat elevated temperatures, and by reacting the 4-acylated 1-alkoxy-2-alkylbenzenes thus obtained, according to the Bayer-Villinger reaction, with hydrogen peroxide in the presence of acetic anhydride at room temperature or at slightly elevated temperatures.

The particular new compounds according to the present invention significantly have a strong insecticidal action but a markedly low toxicity towards warm-blooded animals and markedly low phytotoxicity. The insecticidal actions or effects appear rapidly and are long-lasting. The instant compounds can, therefore, be used with good results for combating noxious sucking and biting insects and Diptera.

In this regard, typical sucking insects contemplated herein essentially include aphids, such as the peach aphid (*Myzus persicae*); coccids, such as *Aspiotus hederea;* Thysanoptera, such as *Hercinothrips femoralis;* and bugs, such as the beet leaf bug (*Piesma quadrata*); and the like.

Furthermore, the biting insects in question herein essentially include butterfly larvae, such as *Plutella maculipenis*; beetles, such as the grain weevil (*Calandra granaria*), but also species living in the soil, such as wire worms (*Agriotes* sp.); cockroaches, such as the German cockroach (*Blattella germanica*); Orthoptera,, such as the cricket (*Gryllus domesticus*); termites, such as Reticulitermea; and Hymenoptera, such as ants; and the like.

Also, the Diptera contemplated herein essentially comprise flies, such as the fruit fly (*Drosophila melanogaster*), the house fly (*Musca domestica*); and gnats, such as the mosquito (*Aedes aegypti*); and the like.

Because of their good stability to alkalis, the new alkoxyphenyl-N-methyl carbamic acid esters according to the present invention are especially well suited for combating the generally regarded hygiene pests which are usually found in stables, homes and storage rooms. In the same way, because of their comparatively good compatibility with higher plants, the instant compounds may be used with advantage as plant protective agents, for example, to protect such plants against pests of the above noted types. The low degree of mammalian toxicity as compared with the high degree of pesticidal activity of the instant compounds renders such compounds extremely well suited to handling and manipulation in preparing formulations which may be used manually or by automatic equipment for applying the same to indoor and outdoor surfaces and substrates, including plants and surrounding soil, whereby to control and minimize advantageously the insect problem as it may occur in a given situation.

Thus, the new compounds of the instant invention can be used as pesticides either alone or in admixture with solid or liquid carriers or diluents.

The active compounds according to the instant invention can be utilized, if desired, in the form of the usual formulations or compositions with dispensible carrier vehicles, such as solutions, emulsions, suspensions, emulsifiable concentrates, spray powders, pastes, soluble powders, dusting agents, granulates, etc. These are prepared in known manner, for instance by extending the active agents with solvents and/or dispersible solid carriers optionally with the use of emulsifying agents and/or dispersing agents, whereby, for example, in the case where water is used as diluent, organic solvents may be added as auxiliary solvents (cf. Agriculture Chemicals, March 1960, pages 35-38). The following may be chiefly considered for use as carrier vehicles or assistants for this purpose: solvents, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.) ethers, ether alcohols (for instance, glycol monomethyl ether, etc.), amines (for instance, ethanolamine, etc.), amides (for instance, dimethyl formamide, etc.), ketones (for instnce, acetone, etc.), and water; dispersible finely divided solid carriers, such as natural ground minerals (for instance, kaolins, alumina, silica, chalk, i.e., calcium carbonate, talc, kieselguhr, etc.), and synthetic ground minerals (for instance, highly dispersed silicic acid, silicates, e.g., alkali silicates, etc.); emulsifying agents, such as nonionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

Accordingly, the substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercial preparations, these generally contemplate carrier composition mixtures in which the active compound is present in an amount substantially between about 0.1–95% by weight, and preferably 0.5–90% by weight, of the mixture, whereas carrier composition mixtures suitable for field application generally contemplate those in which the active compound is present in an amount substantially between about 0.1 and 20% by weight, and preferably 0.5 and 10% by weight, of the mixture. Thus, such mixtures overall contemplate an amount of the active compound which is effective for the purpose in question and which is generally between about 0.1 and 95% by weight of the mixture. Specifically, the active compound may be applied to indoor and outdoor walls, surfaces, substrates, and the like, in concentrations substantially between about 0.1 and 5 grams per square meter of surface area being treated. Thus, the instant formulations or compositions are applied in the usual manner, for example, by spraying, atomizing, vaporizing, scattering, and the like.

The following examples are given for the purpose of illustrating, while not limiting, the usefulness of the compounds according to the present invention.

EXAMPLE 1

Residual test

Test insects: *Aedes aegypti*

Wettable powder base consists of:

3% sodium diisobutylnaphthalene-1-sulfonate,
6% sulfite waste liquor, partially condensed with aniline,
40% highly dispersed silicic acid, containing calcium oxide,
51% colloidal kaolin.

To produce a suitable preparation of the particular active compound, 1 part by weight of such active compound is intimately mixed with 9 parts by weight of the wettable powder base. The spray powder thus obtained is suspended in 90 parts of water.

The suspension of the active compound is sprayed, in an amount of 1 g. of active compound per square meter, onto various substrates.

The spray coatings are tested at definite time intervals for their biological activity.

For this purpose, the test insects are placed on the treated substrates. The test insects are covered with a squat cylinder, the upper end of which is closed with a wire mesh, in order to prevent the insects from escaping. After a residence time of 8 hours on the substrate, the knock-down effect in each instance is determined percentagewise.

The active compounds, the type of substrates and the results obtained can be seen from Table 1 which follows:

surprising and could not be predicted on the basis of the known insecticidal activity of the prior art compounds.

TABLE 1.—RESIDUAL TEST

| Active compound | Test substrate | Knockdown effect after 8 hours on test insects in percent, age of residual coating in weeks | | | |
|---|---|---|---|---|---|
| | | 1 | 2 | 4 | 6 |
| (A) 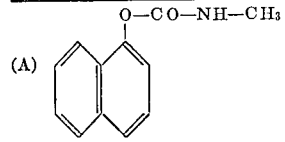 (known) | Limed clay | 60 | 0 | | |
| (B) 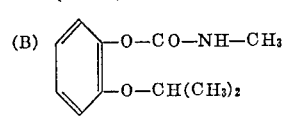 (known) | Limed clay | 50 | 0 | | |
| (C) 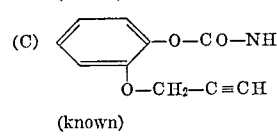 (known) | Limed clay | 100 | 100 | 0 | |
| (III′) 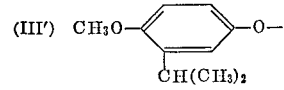 | Limed clay | 100 | 100 | 100 | 40 |

As may be seen from the foregoing test data, the corresponding 2-alkoxyphenyl carbamate (compound B) is 16.7% less potent than the α-naphthyl carbamate (compound A) which possesses no alkoxy group on the ring, after one week of the test period, with both compound B and compound C having no residual effect after the first week of the test period. On the other hand, compound III is 66.7% more potent than compound A and 100% more potent than compound B after one week of the test period, with the 100% effectiveness lasting after two and four weeks of the test period, while compound A and compound B have no effect, as aforesaid, after the first week. As for propargyloxyphenyl carbamate (compound C), this compound is obviously active because of the distinct degree of unsaturation in the propargyl moiety as opposed to the saturated alkyl moiety in the 2-position of compound B, but even so the effectiveness of compound C lasts for only two weeks of the test period. Thereafter, no residual effect remains. In contrast thereto, compound III in accordance with the invention, which possesses entirely different types of substituents at the 3- and 4-positions of the phenyl ring, i.e., not limited merely to alkoxy as in compound B or propargyloxy as in compound C, or to ring positions comparable to those of compound A, compound B or compound C, maintains a 100% effectiveness even after four weeks of the test period, and residual effectiveness lasts for six weeks to the extent of a 40% effectiveness. Such results are indeed

EXAMPLE 2

$LD_{100}$ test

Test insects: *Sitophilus granarius*

Solvent: acetone 2 parts by weight of the particular active compound are dissolved in 100 parts by volume of the solvent. The solution thus obtained is diluted with a further amount of solvent to the desired concentration.

2.5 ml. of the solution of the active compound are transferred to a Petri dish by means of a pipette, a filter paper of about 9.5 cm. diameter being situated on the bottom of the Petri dish. The Petri dish is left uncovered until the solvent has completely evaporated. The amount of the active compound per square meter of filter paper varies, of course, with the concentration of the solution of active compound used. About 25 test insects are subsequently placed in the Petri dish, which is then covered with a glass lid.

The condition of the test insects is observed one day after and three days after the start of the test (i.e., on the second and fourth days of the test). The knockdown effect ($LD_{100}$) is determined percentagewise.

The active compounds, their concentrations, the test insects used, and results obtained can be seen from Table 2 as follows:

TABLE 2.—$LD_{100}$ TEST

| Active compound | Concentration of active compound, percent solutions | *Sitophilus granarius* knockdown effect in percent |
|---|---|---|
| (C) 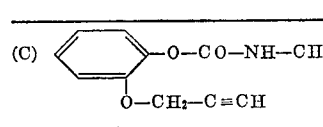 (known) | 0.2<br>0.04<br>0.008 | 100<br>70<br>0 |
| (III″) 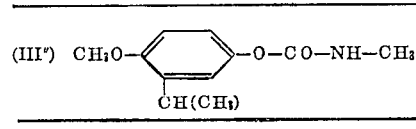 | 0.2<br>0.04<br>0.008<br>0.0016 | 100<br>100<br>80<br>0 |

In accordance with the test data of Table 2, considering compound C as having the greatest potency of the prior art compounds as established in connection with the test data of Table 1, it is seen that compound III in accordance with the present invention possesses much greater potency along with the aforementioned residual effectiveness as compared with compound C. Specifically, at 0.04% concentration, compound III of the invention is 43% more effective than compound C of the prior art, i.e., 100% more effective as opposed to only a 70% effectiveness for the prior art compound, and at 0.008% concentration, instant compound III is still 80% more effective than compound C, i.e., utilizing one-fifth of the 0.04% concentration which produced a 100% effectiveness. Accordingly, not only a saving in the amount of the active compound may now be provided in accordance with the present invention for the instant uses, but extensive residual effectiveness is also attainable so that good potency and long-lasting effectiveness may be enjoyed when using the compounds in accordance with the present invention as compared with the closest prior art compounds.

The following examples are given for the purpose of illustrating, while not limiting, the process used for the production of the new compounds according to the present invention.

EXAMPLE 3

In a three-necked flask of 1 liter capacity (fitted with stirrer, thermometer and dropping funnel), 200 g. (1.2 mol) of 3-isopropyl-4-methoxyphenol are dissolved in 300 ml. of ligroin and 5 drops of triethylamine are added to the solution. 90 grams of methyl isocyanate are subsequently added dropwise, while stirring and maintaining the temperature between 35 and 40° C. by occasional cooling. The reaction product begins to crystallize out after about one hour. Yield: 253 g. 3-isopropyl-4-methoxyphenyl-N-methyl carbamate (95% of the theoretical); M.P. 96° C.

To prepare the phenol used as starting material, 2-isopropyl-anisole is reacted with acetic anhydride in the presence of carbon disulfide and $AlCl_3$ at a slightly elevated temperature, the corresponding acetophenone thereby being formed. This is oxidized with hydrogen peroxide in the presence of acetic anhydride at a slightly elevated temperature to give correspondingly 3-isopropyl-4-methoxyphenol.

EXAMPLE 4

Example 3 is repeated, using the corresponding molar amounts of methyl isocyanate and 3-methyl-, 3-ethyl-, 3-n-propyl-, 3-isopropyl-, 3-n-butyl-, 3-isobutyl-, 3-sec.-butyl-, and 3-tert.-butyl-4-methoxy-, -4-ethoxy-, -4-n-propoxy-, -4-isopropoxy-, -4-n-butoxy-, -4-isobutoxy-, -4-sec.-butoxy-, and -4-tert.-butoxyphenol, respectively, and the corresponding 3-lower alkyl-4-lower alkoxy-phenyl-N-methyl carbamate is produced. The starting phenol in each instance is prepared in a manner analogous to the procedure noted in Example 3. Among the particular carbamates in question are 3-methyl-4-methoxyphenyl-N-methyl carbamate; 3-methyl-4-ethoxyphenyl-N-methyl carbamate; 3-methyl-4-n-propoxyphenyl-N-methyl carbamate; 3-methyl-4-tert.-butoxyphenyl-N-methyl carbamate, and the like; as well as 3-isopropyl-4-methoxyphenyl-N-methyl carbamate; 3-isopropyl-4-ethoxyphenyl-N-methyl carbamate; 3-isopropyl-4-n-propoxyphenyl-N-methyl carbamate; 3-isopropyl-4-isopropoxyphenyl-N-methyl carbamate; 3-isopropyl-4-isobutoxyphenyl-N-methyl carbamate; 3-isopropyl-4-sec.-butoxyphenyl-N-methyl carbamate, and the like.

All of the foregoing 3-lower alkyl-4-lower alkoxyphenyl-N-methyl carbamates in accordance with the present invention possess the desired high insecticidal activity coupled with a high degree of stability and a retention of effectiveness even after long periods of time and even in alkaline substrates, such as limed clay, and all of such compounds enjoy a low degree of mammalian toxicity and a low degree of phytotoxicity whereby such compounds are useful in combating pests on interior and exterior surfaces and substrates, and the like, as well as plants and vicinal soil when used either alone or in admixture with one another or in admixture with other known compatible compounds and/or a dispersible carrier vehicle, the instant active compound, of course, being present in a pesticidally, especially an insecticidally, effective amount.

Accordingly, the present invention concerns a versatile process for producing 3-lower-alkyl-4-lower alkoxyphenyl-N-methyl carbamic acid esters of the type noted in Formula I above by reacting a corresponding lower alkyl-4-lower-alkoxyphenol of the type noted in Formula II above, with methyl isocyanate, optionally in the presence of an inert organic solvent, and optionally in the presence of a reaction accelerator, such as a tertiary amine, preferably at a temperature substantially between about 0 and 150° C., as well as such alkoxyphenyl-N-methyl carbamic acid esters so produced, and especially 3-isopropyl-4-methoxy-N-phenyl carbamic acid ester, which possess the desired high biocidal or pesticidal, and especially insecticidal, activity, high degree of stability, rapid action and prolonged retention of effectiveness, together with the desired low degree of toxicity towards warm-blooded animals and low degree of phytotoxicity.

The present invention also contemplates compositions of such 3-lower-alkyl-4-lower alkoxyphenyl-N-methyl carbamic acid esters with dispersible carrier vehicles, including not only commercial preparations in which the active compound is present in an amount substantially between about 0.1 and 95% by weight, and preferably 0.5 and 90% by weight, of the mixture, but also field application compositions in which the active compound is present in an amount substantially between about 0.1 and 20% by weight, and preferably 0.5–10% by weight, of the mixture.

Furthermore, the instant invention contemplates a method of combating pests, such as insects and the like, by applying to such pests, i.e., insects, and their habitat a 3-lower alkyl-4-lower alkoxyphenyl-N-methyl carbamic acid ester of the instant type either alone or with a carrier vehicle of the above-noted type, with the active compound being present in a pesticidally, and especially insecticidally, effective amount.

In particular, the present invention concerns a method of practicing hygiene techniques for ridding interior and exterior surfaces and substrates of stables, homes, storage rooms, and the like, of insects, by applying to such insects and such interior and exterior surfaces and substrates, as the case may be, an insecticidally effective amount of an active compound of the instant type.

Also, the instant invention contemplates a method of combating insects, particularly in agricultural crops, by applying to such agricultural crops and to the surrounding soil a pesticidally effective amount of an active compound of the instant type.

Significantly, the present invention also contemplates dosages having pesticidal, and especially insecticidal, effect when applied to a square meter of a surface to be treated, which comprise substantially between about 0.1 and 5 grams of a 3-lower-alkyl-4-lower-alkoxyphenyl-N-methyl carbamic acid ester of the instant type, as well as compositions having pesticidal, and especially insecticidal, effect when applied to a square meter of a surface to be treated, which comprise mixtures of substantially between about 0.4 and 4995 grams of a dispersible carrier vehicle of the instant type together with substantially between about 0.1 and 5 grams of a 3-lower-alkyl-4-lower-alkoxyphenyl-N-methyl carbamic acid ester of the foregoing type.

Additionally, the present invention contemplates a method of combating pests by applying to such pests and surfaces and substrates a dosage per square meter of such surface and substrate, and the like, of a composition of the foregoing type containing a mixture of substantially between about 0.4–4995 grams of a dispersible carrier vehicle and substantially between about 0.1 and 5 grams of an ester of the instant kind.

The foregoing active esters contemplated by the present invention may thus be applied alone or in the form of compositions onto walls, surfaces, substrates, and the like, both indoors and outdoors, and onto agricultural plants and the surrounding soil as well, for achieving the foregoing purposes. Particularly effective results are achieved using compositions containing, in addition to 0.1–5 grams of the active ester compound, substantially between about 0.9 and 995 grams of the dispersible carrier vehicle with respect to a given square meter of the particular surface area to be treated.

It will be appreciated that the instant specification and examples are set forth by way of illustration and not limitation, and that various modifications and changes may be made without departing from the spirit and scope of the present invention which is to be limited only by the scope of the appended claim.

What is claimed is:
1. 3 - isopropyl - 4-methoxyphenyl-N-methyl carbamic acid ester having the formula

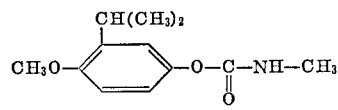

References Cited
UNITED STATES PATENTS
3,111,539 11/1963 Bocker et al. _____ 260—479
3,140,167 7/1964 Haubein _____ 260—479 XR

FOREIGN PATENTS
1,143,670 2/1963 Germany.

OTHER REFERENCES
Metcalf et al.: Journal of Economic Entomology, vol. 53, pp. 828–832 (1960).

LORRAINE A. WEINBERGER, *Primary Examiner.*

M. G. BERGER, *Assistant Examiner.*

U.S. Cl. X.R.
424—300

UNITED STATES PATENT OFFICE
CERTIFICATE OF CORRECTION

Patent No. 3,433,826                                                      March 18, 1969

Rudolf Heiss et al.

It is certified that error appears in the above identified patent and that said Letters Patent are hereby corrected as shown below:

Columns 7 and 8, TABLE 2, first column, the portion of the formula reading $\overset{|}{C}H(CH_3)$      should read      $\overset{|}{C}H(CH_3)_2$ Signed and sealed this 31st day of March 1970.

(SEAL)
Attest:

Edward M. Fletcher, Jr.                                  WILLIAM E. SCHUYLER, JR.
Attesting Officer                                                Commissioner of Patents